US012333998B2

(12) United States Patent
Lee et al.

(10) Patent No.: US 12,333,998 B2
(45) Date of Patent: Jun. 17, 2025

(54) DISPLAY DEVICE

(71) Applicant: Samsung Display Co., LTD., Yongin-si (KR)

(72) Inventors: Tak-Young Lee, Yongin-si (KR); Byungseok Choi, Yongin-si (KR); Bogyeong Kim, Yongin-si (KR); Jonghee Kim, Yongin-si (KR); Boyong Chung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/213,335

(22) Filed: Jun. 23, 2023

(65) Prior Publication Data

US 2024/0112621 A1 Apr. 4, 2024

(51) Int. Cl.
*G09G 3/32* (2016.01)

(52) U.S. Cl.
CPC ....... *G09G 3/32* (2013.01); *G09G 2300/0426* (2013.01); *G09G 2310/0202* (2013.01); *G09G 2310/0291* (2013.01); *G09G 2320/0233* (2013.01)

(58) Field of Classification Search
CPC ............. G09G 3/32; G09G 2300/0426; G09G 2310/0202; G09G 2310/0291; G09G 2320/0233
See application file for complete search history.

(56) References Cited

U.S. PATENT DOCUMENTS

2005/0212986 A1* 9/2005 Kawasaki ......... G02F 1/136286 349/43
2007/0242178 A1* 10/2007 Kawasaki ............ G02F 1/1362 349/43
2008/0170006 A1* 7/2008 Koo ..................... G09G 3/3266 345/76
2009/0219233 A1* 9/2009 Park ..................... G09G 3/3275 345/80
2014/0036191 A1* 2/2014 Zhao ................. G02F 1/136286 349/46
2019/0139476 A1* 5/2019 Tsai ........................ G09G 3/20
2019/0197961 A1* 6/2019 Kim ..................... G09G 3/3266
2021/0090491 A1* 3/2021 Park ..................... G09G 3/3233

FOREIGN PATENT DOCUMENTS

KR 10-0681039 2/2007

* cited by examiner

*Primary Examiner* — Abbas I Abdulselam
(74) *Attorney, Agent, or Firm* — CANTOR COLBURN LLP

(57) ABSTRACT

A display device includes a display panel including a plurality of pixels respectively connected to a plurality of data lines and a plurality of scan lines, a data driver which outputs data signals to the plurality of data lines including a first data line and a second data line branched from a data output terminal connected to the data driver, and a scan driver which outputs scan signals to the plurality of scan lines. A first scan output terminal and a second scan output terminal respectively connected to the plurality of scan lines are connected to the scan driver. One of the first scan output terminal and the second scan output terminal is connected to a resistance.

19 Claims, 8 Drawing Sheets

DISPLAY DEVICE

This application claims priority to Korean Patent Application No. 10-2022-0124790, filed on Sep. 30, 2022, and all the benefits accruing therefrom under 35 U.S.C. § 119, the content of which in its entirety is herein incorporated by reference.

BACKGROUND

1. Field

Embodiments relate to a display device.

2. Description of the Related Art

A display device may include a display panel for displaying an image and a driver for controlling the image displayed on the display panel.

The display panel may include a plurality of data lines, a plurality of scan lines, and a plurality of pixels electrically connected to corresponding data lines of the plurality of data lines and corresponding scan lines of the plurality of scan lines. The driver may include a data driver that provides data voltages to the data lines, a scan driver that provides scan signals to the scan lines, and a controller that controls the data driver and the scan driver.

SUMMARY

Embodiments provide a display device with improved luminance deviation.

A display device in an embodiment of the disclosure may include a display panel including a plurality of pixels respectively connected to a plurality of data lines and a plurality of scan lines, a data driver which outputs data signals to the plurality of data lines including a first data line and a second data line branched from a data output terminal connected to the data driver, and a scan driver which outputs scan signals to the plurality of scan lines. A first scan output terminal and a second scan output terminal respectively connected to the plurality of scan lines may be connected to the scan driver. One of the first scan output terminal and the second scan output terminal may be connected to a resistance.

In an embodiment, each of the first scan output terminal and the second scan output terminal may extend in a first direction, and the first scan output terminal and the second scan output terminal may be alternately disposed along a second direction perpendicular to the first direction.

In an embodiment, each of the plurality of pixels may include a first sub-pixel which includes a first pixel electrode and emits a first light, a second sub-pixel which includes a second pixel electrode and emits a second light different from the first light, and a third sub-pixel which includes a third pixel electrode and emits a third light different from the first and second lights. The plurality of scan lines may overlap the first, second and third pixel electrodes in a plan view.

In an embodiment, the plurality of scan lines may include a first scan line connected to the first scan output terminal and a second scan line connected to the second scan output terminal, and an area of a portion where the first scan line and the first, second and third pixel electrodes of a first pixel overlap may be greater than an area of a portion where the second scan line and the first, second and third pixel electrodes of a second pixel adjacent to the first pixel overlap.

In an embodiment, an area of a portion where the first scan line and the first pixel electrode of the first pixel overlap may be greater than an area of a portion where the second scan line and the first pixel electrode of the second pixel overlap.

In an embodiment, the first light may be green light.

In an embodiment, the first scan output terminal may be plural, and each of first scan output terminals may be connected to resistances having different resistance values.

In an embodiment, a first resistance connected to a first scan output terminal electrically connected to an upper side of the display panel among the first scan output terminals may have a resistance value smaller than a second resistance connected to a first scan output terminal electrically connected to a lower side of the display panel among the first scan output terminals.

In an embodiment, a third resistance connected to a first scan output terminal electrically connected to a central side of the display panel among the first scan output terminals may have a resistance value greater than the first resistance and the resistance value smaller than the second resistance.

In an embodiment, each of the first data line and the second data line may be alternately connected to pixels disposed in an odd column among the plurality of pixels and pixels disposed in an even column among the plurality of pixels.

In an embodiment, a first scan line among the plurality of scan lines may be connected to pixels disposed in an odd column among the plurality of pixels, and a second scan line among the plurality of scan lines may be connected to pixels disposed in an even column among the plurality of pixels.

A display device in an embodiment of the disclosure may include a display panel including a plurality of pixels respectively connected to a plurality of data lines and a plurality of scan lines, a data driver which outputs data signals to the plurality of data lines including a first data line and a second data line branched from a data output terminal connected to the data driver, and a scan driver which outputs scan signals to the plurality of scan lines. A first scan output terminal and a second scan output terminal respectively connected to the plurality of scan lines may be connected to the scan driver. The scan driver may include a first output buffer connected to the first scan output terminal and a second output buffer connected to the second scan output terminal and having a different size from the first output buffer.

In an embodiment, each of the first scan output terminal and the second scan output terminal may extend in a first direction, and the first scan output terminal and the second scan output terminal may be alternately disposed along a second direction perpendicular to the first direction.

In an embodiment, each of the plurality of pixels may include a first sub-pixel which includes a first pixel electrode and emits a first light, a second sub-pixel which includes a second pixel electrode and emits a second light different from the first light, and a third sub-pixel which includes a third pixel electrode and emits a third light different from the first and second lights. The plurality of scan lines may overlap the first, second and third pixel electrodes in a plan view.

In an embodiment, the plurality of scan lines may include a first scan line connected to the first scan output terminal and a second scan line connected to the second scan output terminal, and an area of a portion where the first scan line and the first, second and third pixel electrodes of a first pixel overlap may be greater than an area of a portion where the second scan line and the first, second and third pixel electrodes of a second pixel adjacent to the first pixel overlap.

In an embodiment, an area of a portion where the first scan line and the first pixel electrode of the first pixel overlap may be greater than an area of a portion where the second scan line and the first pixel electrode of the second pixel overlap.

In an embodiment, the first light may be green light.

In an embodiment, a size of the first output buffer may be larger than a size of the second output buffer.

In an embodiment, each of the first data line and the second data line may be alternately connected to pixels disposed in an odd column among the plurality of pixels and pixels disposed in an even column among the plurality of pixels.

In an embodiment, a first scan line among the plurality of scan lines may be connected to pixels disposed in an odd column among the plurality of pixels, and a second scan line among the plurality of scan lines may be connected to pixels disposed in an even column among the plurality of pixels.

In a display device in embodiments of the disclosure, a scan driver may extend in a first direction, and may be connected to a first scan output terminal and a second scan output terminal alternately disposed along a second direction perpendicular to the first direction. Since the first scan output terminal is connected to a resistance line, a coupling effect between a scan line connected to the first scan output terminal and pixel electrodes of a pixel overlapping the scan line may be alleviated.

Accordingly, a deviation between a voltage of the pixel electrodes of the pixel and a voltage of pixel electrodes of a pixel adjacent to the pixel on left side or right side may be improved, thereby improving a luminance deviation between left and right pixels.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
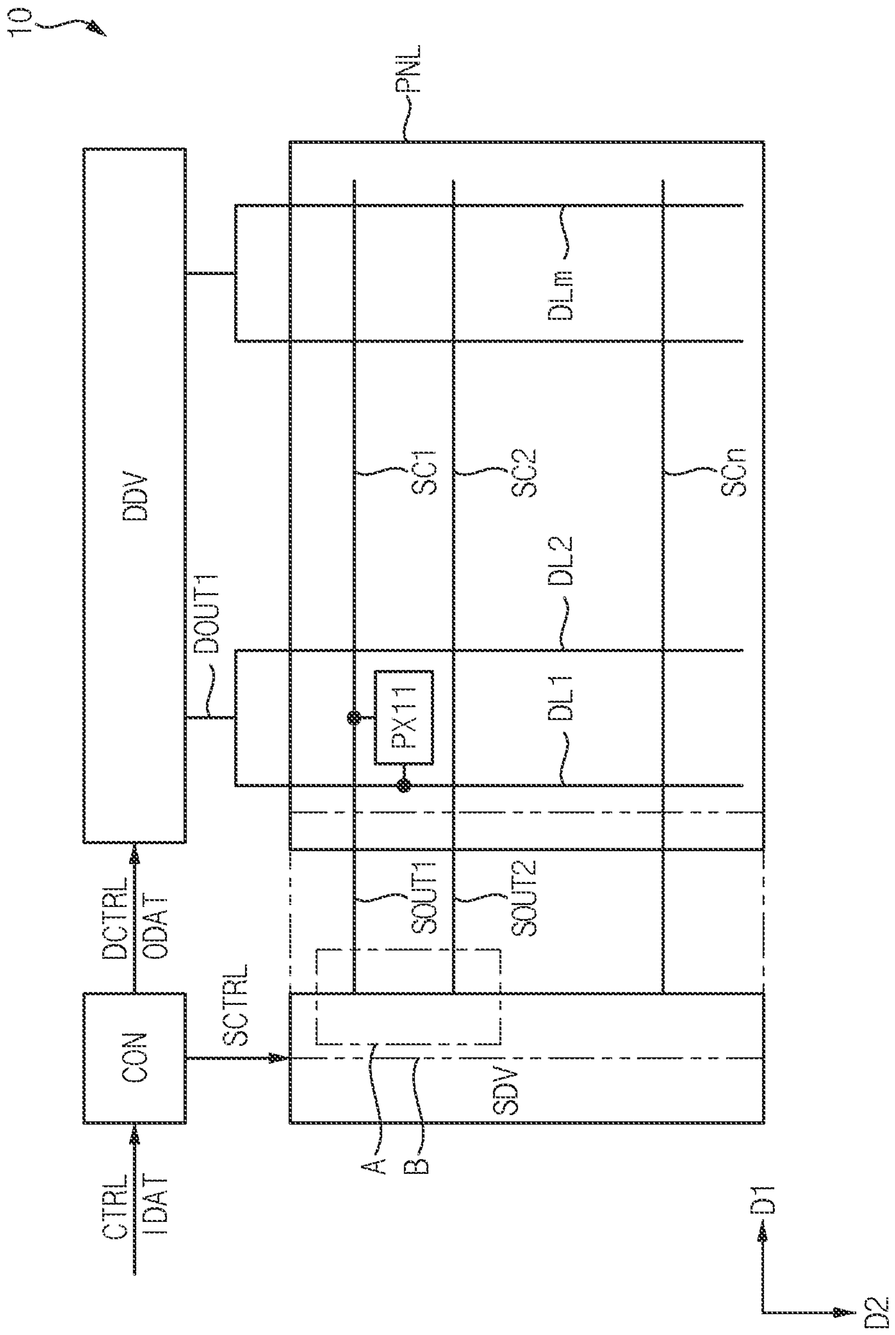
FIG. 1 is a block diagram illustrating an embodiment of a display device.

Hereinafter, embodiments of the disclosure will be described in more detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device.

Referring to FIG. 1, a display device 10 in an embodiment of the disclosure may include a display panel PNL and a panel driver that drives the display panel PNL. The panel driver may include a data driver DDV, a scan driver SDV and a controller CON.

A plurality of pixels that emits light may be disposed on the display panel PNL, and accordingly, an image may be displayed on the display panel PNL. The plurality of pixels may be arranged in a matrix form along a first direction D1 and a second direction D2 crossing the first direction D1. In an embodiment, the second direction D2 may be perpendicular to the first direction D1, for example.

Each of the plurality of pixels may be electrically connected to a plurality of data lines DL1 to DLm and a plurality of scan lines SC1 to SCn. Here, n and m may be natural numbers. In an embodiment, a (1-1)th pixel PX11 may be connected to a first data line DL1 and a first scan line SC1, for example.

Each of the data lines DL1 to DLm may extend along the second direction D2, and may be arranged along the first direction D1. Each of the data lines DL1 to DLm may be electrically connected to the data driver DDV. Specifically, the data driver DDV may be connected to data output terminals, and each of the data output terminals may be connected to two data lines among the data lines DL1 to DLm. In an embodiment, the data driver DDV may be connected to a first data output terminal DOUT1, and the first data output terminal DOUT1 may be connected to the first data line DL1 and a second data line DL2, for example. That is, the first data line DL1 and the second data line DL2 may be branched from the first data output terminal DOUT1. Each of the data lines DL1 to DLm may transmit a data signal to the pixels.

Each of the scan lines SC1 to SCn may extend along the first direction D1, and may be arranged along the second direction D2. Each of the scan lines SC1 to SCn may be electrically connected to the scan driver SDV. Specifically, the scan driver SDV may be connected to scan output terminals, and each of the scan output terminals may be connected to one of the scan lines SC1 to SCn.

In an embodiment, the scan output terminals may include a first scan output terminal SOUT1 and a second scan output terminal SOUT2. The first scan output terminal SOUT1 and the second scan output terminal SOUT2 may extend along the first direction D1, and may be alternately disposed along the second direction D2. That is, each of the first scan output terminal SOUT1 and the second scan output terminal SOUT2 may be connected to one scan line among the scan lines SC1 to SCn. In an embodiment, the scan driver SDV may be connected to the first scan output terminal SOUT1, and the first scan output terminal SOUT1 may be connected to the first scan line SC1, for example. In addition, the scan driver SDV may be connected to the second scan output terminal SOUT2, and the second scan output terminal SOUT2 may be connected to a second scan line SC2. Each of the scan lines SC1 to SCn may transmit a scan signal to the pixels.

The data driver DDV may generate the data signal based on an output image data ODAT and a data control signal DCTRL. In an embodiment, the data driver DDV may generate the data signal corresponding to the output image data ODAT and output the data signal in response to the data control signal DCTRL, for example. The data control signal DCTRL may include an output data enable signal, a horizontal start signal, and a load signal. In an embodiment, the data driver DDV may be disposed (e.g., mounted) on the display panel PNL or may be integrated in a peripheral portion of the display panel PNL. In another embodiment, the data driver DDV may be implemented with one or more integrated circuits ("ICs").

The scan driver SDV may generate the scan signal based on a scan control signal SCTRL. The scan signal may include a first scan signal and a second scan signal. In an embodiment, each of the first scan signal and the second scan signal may include a gate-on voltage for turning on a transistor and a gate-off voltage for turning off the transistor, for example. The scan control signal SCTRL may include a vertical start signal, a clock signal, or the like. In an embodiment, the scan driver SDV may be disposed (e.g., mounted) on the display panel PNL or may be integrated in a peripheral portion of the display panel PNL. In another embodiment, the scan driver SDV may be implemented with one or more integrated circuits.

The controller CON (e.g., a timing controller ("T-CON")) may receive an input image data IDAT and a control signal CTRL from an external host processor (e.g., graphics processing unit ("GPU")). In an embodiment, the input image data IDAT may be RGB data including red image data, green image data, and blue image data, for example. The control signal CTRL may include a vertical synchronization signal, a horizontal synchronization signal, an input data enable signal, a master clock signal, or the like. The controller CON may generate the data control signal DCTRL, the output image data ODAT and the scan control signal SCTRL based on the input image data IDAT and the control signal CTRL.

Figure 2:
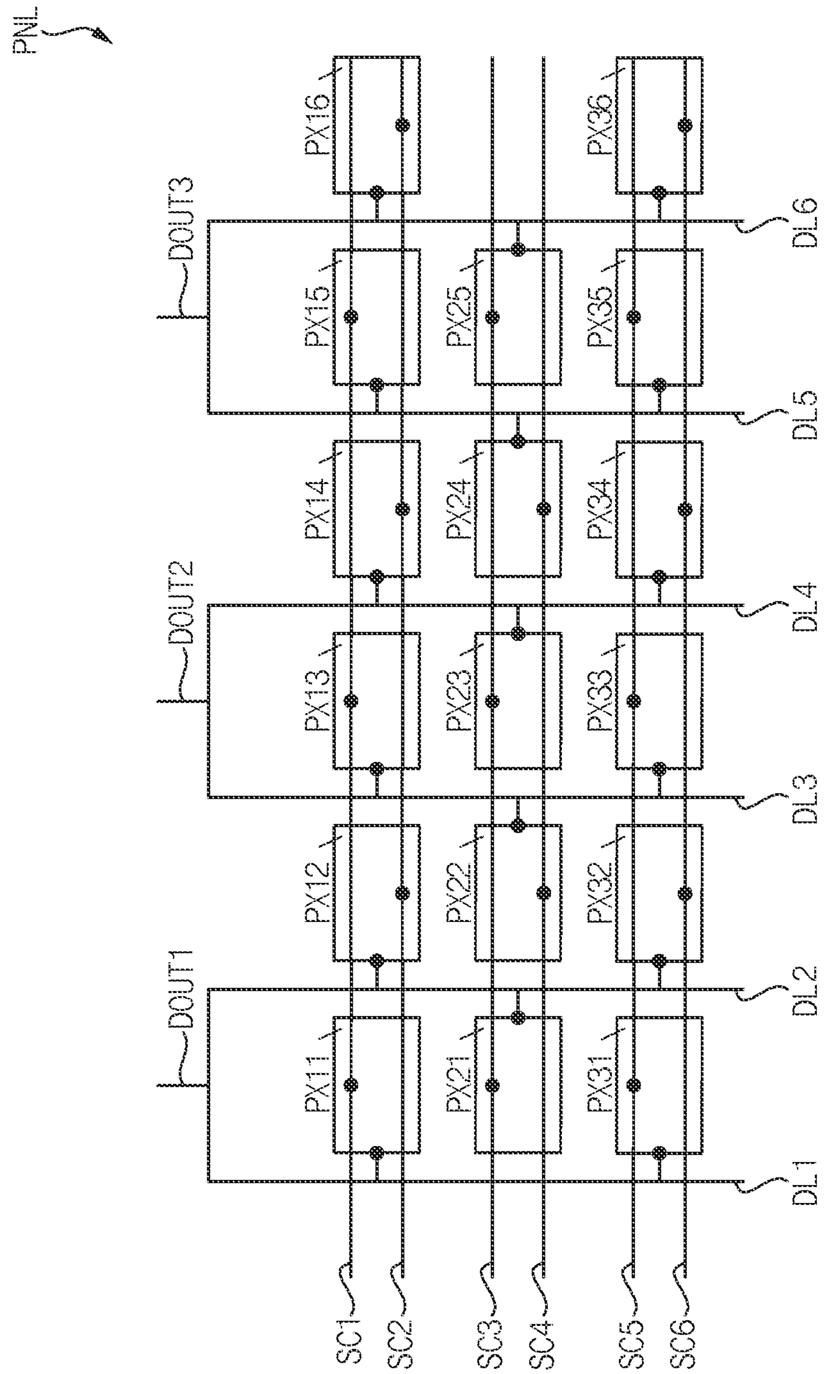
FIG. 2 is a plan view of a display panel included in the display device of FIG. 1.

FIG. 2 is a plan view of a display panel included in the display device of FIG. 1.

Referring to FIG. 2, a plurality of pixels PX11 to PXkm (where k is ½n), the plurality of data lines DL1 to DLm and the plurality of scan lines SC1 to SCn may be disposed on the display panel PNL. In FIG. 2, only some of the pixels PX11 to PXkm, some of the data lines DL1 to DLm, and some of the scan lines SC1 to SCn are shown.

Two adjacent data lines among the data lines DL1 to DLm may be connected to a same data output terminal among the data output terminals. That is, each of the data output terminals may be connected to a data line of an odd column and a data line of an even column adjacent to the data line of the odd column.

In an embodiment, the first data output terminal DOUT1 may be connected to the first data line DL1 and the second data line DL2, a second data output terminal DOUT2 may be connected to a third data line DL3 and a fourth data line DL4, and a third data output terminal DOUT3 may be connected to a fifth data line DL5 and a sixth data line DL6, for example. In other words, the first data line DL1 and the second data line DL2 may be branched from the first data output terminal DOUT1, the third data line DL3 and the fourth data line DL4 may be branched from the second data output terminal DOUT2, and the fifth data line DL5 and the sixth data line DL6 may be branched from the third data output terminal DOUT3.

Each of the pixels PX11 to PXkm may be connected to one of the data lines DL1 to DLm. In an embodiment, each of the data lines DL1 to DLm may be alternately connected to a pixel disposed in an odd column among the pixels PX11 to PXkm and a pixel disposed in an even column adjacent to the odd column. In other words, each of the data lines DL1 to DLm may be alternately connected to pixels arranged along the first direction D1 on left and right sides of each of the data lines DL1 to DLm among the pixels PX11 to PXkm. That is, pixels disposed in one column may be alternately connected to data lines adjacent to left and right sides of the pixels in a plan view.

Specifically, pixels PX11 to PXk1 disposed in a first column among the pixels PX11 to PXkm may be alternately connected to the first data line DL1 and the second data line DL2, and pixels PX12 to PXk2 disposed in a second column among the pixels PX11 to PXkm may be alternately connected to the second data line DL2 and the third data line DL3. Pixels PX13 to PXk3 disposed in a third column among the pixels PX11 to PXkm may be alternately connected to the third data line DL3 and the fourth data line DL4, and pixels PX14 to PXk4 disposed in a fourth column among the pixels PX11 to PXkm may be alternately connected to the fourth data line DL4 and the fifth data line DL5.

In an embodiment, the (1-1)th pixel PX11 may be connected to the first data line DL1, a (2-1)th pixel PX21 may be connected to the second data line DL2, and a (3-1)th pixel PX31 may be connected to the first data line DL1, for example. A (1-2)th pixel PX12 may be connected to the second data line DL2, a (2-2)th pixel PX22 may be connected to the third data line DL3, and a (3-2)th pixel PX32 may be connected to the second data line DL2. A (1-3)th pixel PX13 may be connected to the third data line DL3, a (2-3)th pixel PX23 may be connected to the fourth data line DL4, and a (3-3)th pixel PX33 may be connected to the third data line DL3. A (1-4)th pixel PX14 may be connected to the fourth data line DL4, a (2-4)th pixel PX24 may be connected to the fifth data line DL5, and a (3-4)th pixel PX34 may be connected to the fourth data lines DL4.

However, the disclosure is not limited thereto. In an embodiment, each of the pixels PX11 to PXkm may be connected to a data line adjacent to the left side in a plan view, for example.

Each of the pixels PX11 to PXkm may be connected to one scan line among the scan lines SC1 to SCn. In an embodiment, each of the scan lines disposed in odd rows among the scan lines SC1 to SCn may be connected to pixels disposed in odd columns among the pixels PX11 to PXkm, and each of the scan lines disposed in even rows among the scan lines SC1 to SCn may be connected to pixels disposed in even columns among the pixels PX11 to PXkm. In an embodiment, the first scan line SC1 may be connected to the (1-1)th pixel PX11, the (1-3)th pixel PX13 and a (1-5)th pixel PX15, and the second scan line SC2 may be connected to the (1-2)th pixel PX12, the (1-4)th pixel PX14 and a (1-6)th pixel PX16, for example. A third scan line SC3 may be connected to the (2-1)th pixel PX21, the (2-3)th pixel PX23 and a (2-5)th pixel PX25, and a fourth scan line SC4 may be connected to the (2-2)th pixel PX22 and the (2-4)th pixel PX24. A fifth scan line SC5 may be connected to the (3-1)th pixel PX31, the (3-3)th pixel PX33 and a (3-5)th pixel PX35, and a sixth scan line SC6 may be connected to the (3-2)th pixel PX32, the (3-4)th pixel PX34 and a (3-6)th pixel PX36.

Figure 3:
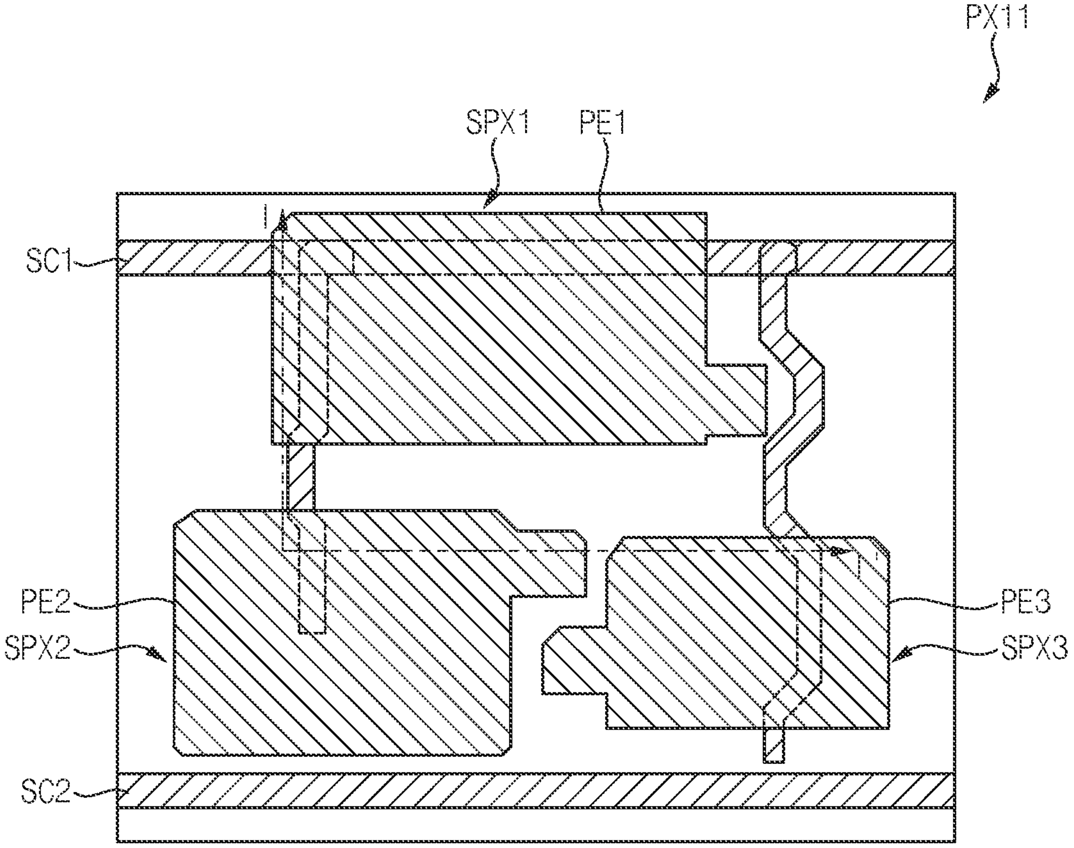
FIG. 3 is a layout diagram for explaining an embodiment of a pixel included in the display device of FIG. 1.
Figure 4:
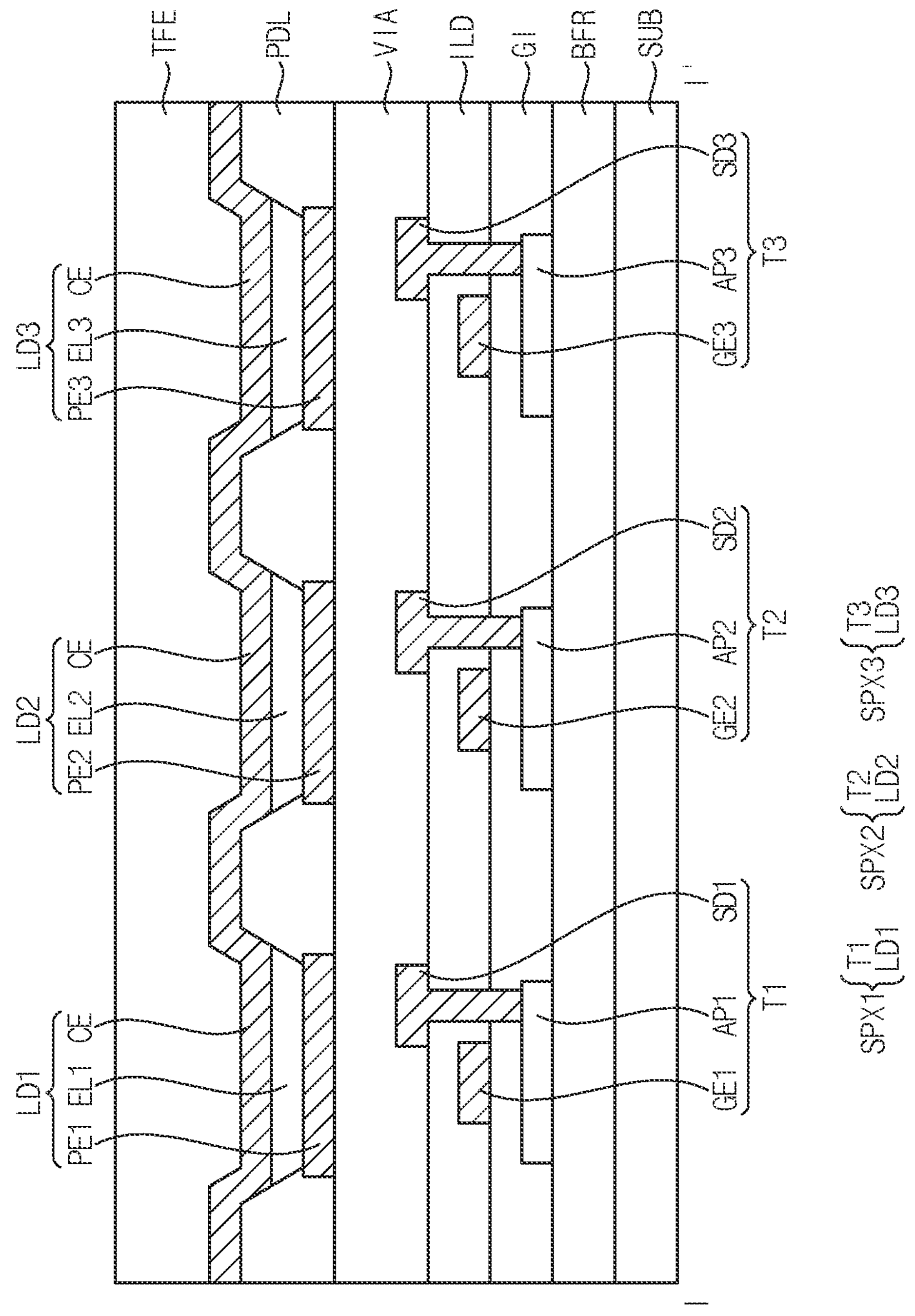
FIG. 4 is a cross-sectional view taken along line I-I' of FIG. 3.

FIG. 3 is a layout diagram for explaining an embodiment of a pixel included in the display device of FIG. 1. FIG. 4 is a cross-sectional view taken along line I-I' of FIG. 3. In an embodiment, FIGS. 3 and 4 may be diagrams for explaining the (1-1)th pixel PX11, for example.

Referring to FIG. 3, the (1-1)th pixel PX11 may include a first pixel electrode PE1, a second pixel electrode PE2 and a third pixel electrode PE3 overlapping the first scan line SC1 in a plan view. Specifically, the first pixel electrode PE1, the second pixel electrode PE2 and the third pixel electrode PE3 may be disposed on the first scan line SC1. The (1-1)th pixel PX11 may receive the scan signal through the first scan line SC1.

The first pixel electrode PE1 may constitute a first sub-pixel SPX1 emitting light of a first color, the second pixel electrode PE2 may constitute a second sub-pixel SPX2 emitting light of a second color, and the third pixel electrode PE3 may constitute a third sub-pixel SPX3 emitting light of a third color. In an embodiment, the first sub-pixel SPX1 may emit green light, the second sub-pixel SPX2 may emit red light, and the third sub-pixel SPX3 may emit blue light, for example. However, the disclosure is not limited thereto.

Referring to FIGS. 3 and 4, the (1-1)th pixel PX11 may include a substrate SUB, a buffer layer BFR, first, second and third active patterns AP1, AP2 and AP3, a gate insulating layer GI, first, second and third gate electrodes GE1, GE2 and GE3, an inter-insulating layer ILD, first, second and third electrodes SD1, SD2 and SD3, a via-insulating layer VIA, first, second and third pixel electrodes PE1, PE2 and PE3, a pixel defining layer PDL, first, second and third light-emitting layers ELL EL2 and EL3, a common electrode CE, and an encapsulation layer TFE.

The substrate SUB may include a transparent material or an opaque material. In embodiments, materials that may be used as the substrate SUB may include glass, plastic, or the like.

The buffer layer BFR may be disposed on the substrate SUB. In an embodiment, the buffer layer BFR may include an inorganic insulating material. In embodiments, inorganic insulating materials that may be used as the buffer layer BFR may include silicon oxide ($SiO_x$), silicon nitride ($SiN_x$), silicon oxynitride ($SiO_xN_y$), or the like. These may be used alone or in any combinations with each other. The buffer layer BFR may prevent metal atoms or impurities from penetrating into the first, second and third active patterns AP1, AP2 and AP3. In addition, the buffer layer BFR may control a heat supply rate during a crystallization process for forming the first, second and third active patterns AP1, AP2 and AP3.

Each of the first, second and third active patterns AP1, AP2 and AP3 may be disposed on the buffer layer BFR. In an embodiment, each of the first, second and third active patterns AP1, AP2 and AP3 may include a silicon semiconductor material or an oxide semiconductor material. In embodiments, silicon semiconductor materials that may be used as each of the first, second and third active patterns AP1, AP2 and AP3 may include amorphous silicon, polycrystalline silicon, or the like. In embodiments, oxide semiconductor materials that may be used as each of the first, second and third active patterns AP1, AP2 and AP3 may include indium gallium zinc oxide ("IGZO"), indium tin zinc oxide ("ITZO"), or the like. These may be used alone or in any combinations with each other. Each of the first, second and third active patterns AP1, AP2 and AP3 may have a source area, a drain area, and a channel area disposed between the source area and the drain area.

The gate insulating layer GI may be disposed on the buffer layer BFR, and may cover the first, second and third active patterns AP1, AP2 and AP3. In an embodiment, the gate insulating layer GI may include an inorganic insulating material. In embodiments, inorganic insulating materials that may be used as the gate insulating layer GI may include silicon oxide, silicon nitride, silicon oxynitride, or the like. These may be used alone or in any combinations with each other.

Each of the first, second and third gate electrodes GE1, GE2 and GE3 may be disposed on the gate insulating layer GI. Each of the first, second and third gate electrodes GE1, GE2 and GE3 may overlap the channel area of each of the first, second and third active patterns AP1, AP2 and AP3. In an embodiment, each of the first, second and third gate electrodes GE1, GE2 and GE3 may include a conductive material. In embodiments, conductive materials that may be used as each of the first, second and third gate electrodes GE1, GE2 and GE3 may include aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), copper (Cu), or the like. These may be used alone or in any combinations with each other.

In an embodiment, each of the first, second and third gate electrodes GE1, GE2 and GE3 may correspond to the first scan line SC1. That is, each of the first, second and third gate electrodes GE1, GE2 and GE3 may transmit the scan signal.

The inter-insulating layer ILD may be disposed on the gate insulating layer GI, and may cover the first, second and third gate electrodes GE1, GE2 and GE3. In an embodiment, the inter-insulating layer ILD may include an inorganic insulating material. In embodiments, inorganic insulating materials that may be used as the inter-insulating layer ILD may include silicon oxide, silicon nitride, silicon oxynitride, or the like. These may be used alone or in any combinations with each other.

Each of the first, second and third electrodes SD1, SD2 and SD3 may be disposed on the inter-insulating layer ILD. In an embodiment, each of the first, second and third electrodes SD1, SD2 and SD3 may include a conductive material. In embodiments, conductive materials that may be used as each of the first, second and third electrodes SD1, SD2 and SD3 may include aluminum, platinum, palladium, silver, magnesium, gold, nickel, neodymium, iridium, chromium, lithium, calcium, molybdenum, titanium, tungsten, copper, or the like. These may be used alone or in any combinations with each other.

Each of the first, second and third electrodes SD1, SD2 and SD3 may contact each of the first, second and third active patterns AP1, AP2 and AP3 through a contact hole defined by removing portions of the gate insulating layer GI and the inter-insulating layer ILD.

The first active pattern AP1, the first gate electrode GE1 and the first electrode SD1 may form a first transistor T1, the second active pattern AP2, the second gate electrode GE2 and the second electrode SD2 may form a second transistor T2, and the third active pattern AP3, the third gate electrode GE3 and the third electrode SD3 may form a third transistor T3.

The via-insulating layer VIA may be disposed on the inter-insulating layer ILD, and may cover the first, second and third electrodes SD1, SD2 and SD3. In an embodiment, the via-insulating layer VIA may include an organic insulating material. In embodiments, organic insulating materials that may be used as the via-insulating layer VIA may include photoresist, polyacrylic resin, polyimide resin, acrylic resin, or the like. These may be used alone or in any combinations with each other.

Each of the first, second and third pixel electrodes PE1, PE2 and PE3 may be disposed on the via-insulating layer VIA. In an embodiment, each of the first, second and third pixel electrodes PE1, PE2 and PE3 may include a conductive material. In embodiments, conductive materials that may be used as each of the first, second and third pixel electrodes PE1, PE2 and PE3 may include aluminum, platinum, palladium, silver, magnesium, gold, nickel, neodymium, iridium, chromium, lithium, calcium, molybdenum, titanium, tungsten, copper, indium tin oxide, indium zinc oxide, or the like. These may be used alone or in any combinations with each other.

The first pixel electrode PE1 may overlap the first gate electrode GE1, the second pixel electrode PE2 may overlap the second gate electrode GE2, and the third pixel electrode PE3 may overlap the third gate electrode GE3. That is, the first, second and third pixel electrodes PE1, PE2 and PE3 may overlap the first scan line SC1 in a plan view.

The pixel definition layer PDL may be disposed on the via-insulating layer VIA. An opening exposing at least a portion of each of the first, second and third pixel electrodes PE1, PE2 and PE3 may be defined in the pixel defining layer PDL. In an embodiment, the pixel defining layer PDL may include an organic insulating material. In embodiments, organic insulating materials that may be used as the pixel defining layer PDL may include photoresist, polyacrylic resin, polyimide resin, acrylic resin, or the like. These may be used alone or in any combinations with each other.

The first light-emitting layer EL1 may be disposed on the first pixel electrode PE1, the second light-emitting layer EL2 may be disposed on the second pixel electrode PE2, and the third light-emitting layer EL3 may be disposed on the third pixel electrode PE3. Specifically, the first light-emitting layer EL1 may be disposed on the first pixel electrode PE1 exposed by the opening of the pixel defining layer PDL, the second light-emitting layer EL2 may be disposed on the second pixel electrode PE2 exposed by the opening of the pixel defining layer PDL, and the third light-emitting layer EL3 may be disposed on the third pixel electrode PE3 exposed by the opening of the pixel defining layer PDL.

In an embodiment, each of the first, second and third light-emitting layers ELL EL2 and EL3 may include or consist of an organic material, and may emit light of a predetermined color. In an embodiment, the first light-emitting layer EL1 may emit green light, the second light-emitting layer EL2 may emit red light, and the third light-emitting layer EL3 may emit blue light, for example. However, the disclosure is not limited thereto.

The common electrode CE may be disposed on the first, second and third light-emitting layers EL1, EL2 and EL3 and the pixel defining layer PDL. In an embodiment, the common electrode CE may include a conductive material. In embodiments, conductive materials that may be used as the common electrode CE may include aluminum, platinum, silver, magnesium, gold, chromium, tungsten, titanium, or the like. These may be used alone or in any combinations with each other.

The first pixel electrode PE1, the first light-emitting layer EL1 and the common electrode CE may form a first light-emitting diode LD1, the second pixel electrode PE2, the second light-emitting layer EL2 and the common electrode CE may form a second light-emitting diode LD2, and the third pixel electrode PE3, the third light-emitting layer EL3 and the common electrode CE may form a third light-emitting diode LD3.

The first transistor T1 and the first light-emitting diode LD1 may constitute the first sub-pixel SPX1, the second transistor T2 and the second light-emitting diode LD2 may constitute the second sub-pixel SPX2, and the third transistor T3 and the third light-emitting diode LD3 may constitute the third sub-pixel SPX3.

That is, the first light-emitting diode LD1 may emit light based on a driving current transmitted from the first transistor T1, the second light-emitting diode LD2 may emit light based on a driving current transmitted from the second transistor T2, and the third light-emitting diode LD3 may emit light based on a driving current transmitted from the third transistor T3.

Figure 5:
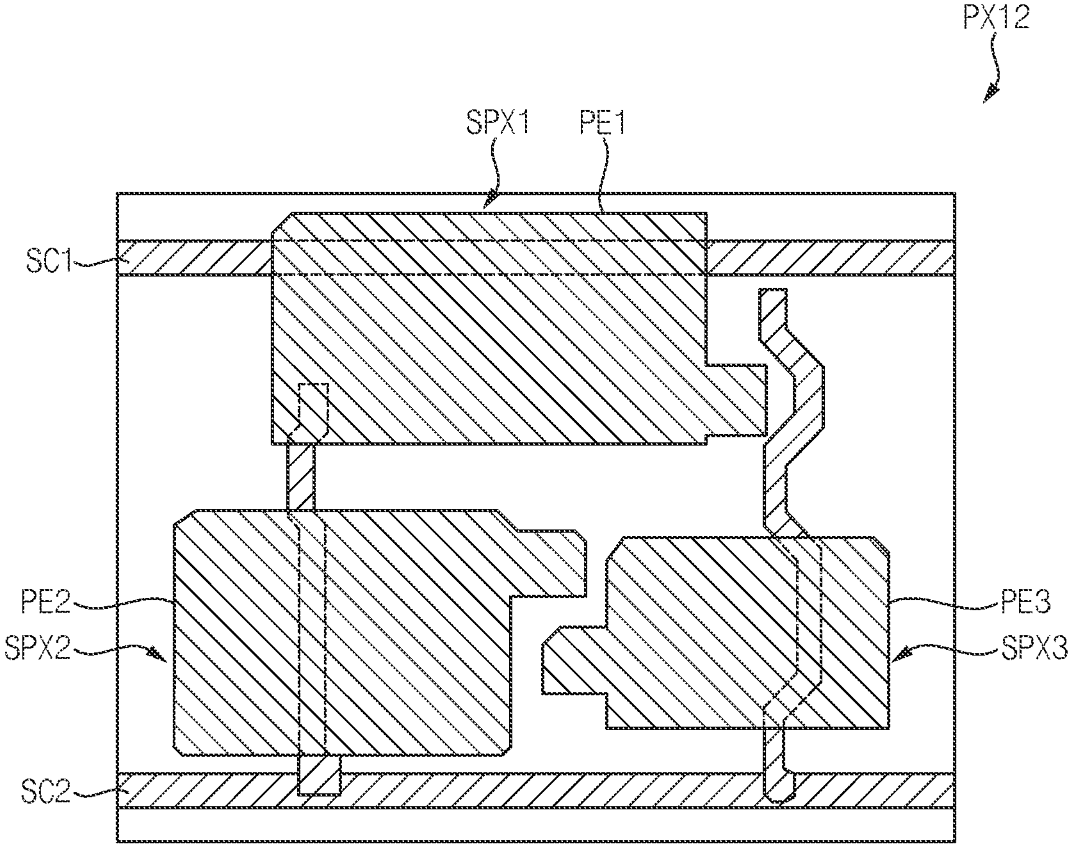
FIG. 5 is a layout diagram for explaining another embodiment of a pixel included in the display device of FIG. 1.

FIG. 5 is a layout diagram for explaining another embodiment of a pixel included in the display device of FIG. 1. In an embodiment, FIG. 5 may be a diagram for explaining the (1-2)th pixel PX12, for example.

Referring to FIGS. 3 and 5, the (1-2)th pixel PX12 may include a first pixel electrode PE1, a second pixel electrode PE2 and a third pixel electrode PE3 overlapping the second scan line SC2 in a plan view. Specifically, the first pixel electrode PE1, the second pixel electrode PE2 and the third pixel electrode PE3 may be disposed on the second scan line SC2. The (1-2)th pixel PX12 may receive the scan signal through the second scan line SC2.

Hereinafter, descriptions overlapping those of the (1-1)th pixel PX11 described with reference to FIGS. 3 and 4 will be omitted or simplified.

In an embodiment, an area of a portion where the first, second and third pixel electrodes PE1, PE2 and PE3 of the (1-1)th pixel PX11 overlap the first scan line SC1 may be larger than an area of a portion where the first, second and third pixel electrodes PE1, PE2 and PE3 of the (1-2)th pixel PX12 overlap the second scan line SC2.

In an embodiment, an area of a portion where the first pixel electrode PE1 of the (1-1)th pixel PX11 overlaps the first scan line SC1 may be larger than an area of a portion where the first pixel electrode PE1 of the (1-2)th pixel PX12 overlaps the second scan line SC2, for example.

Figure 6:
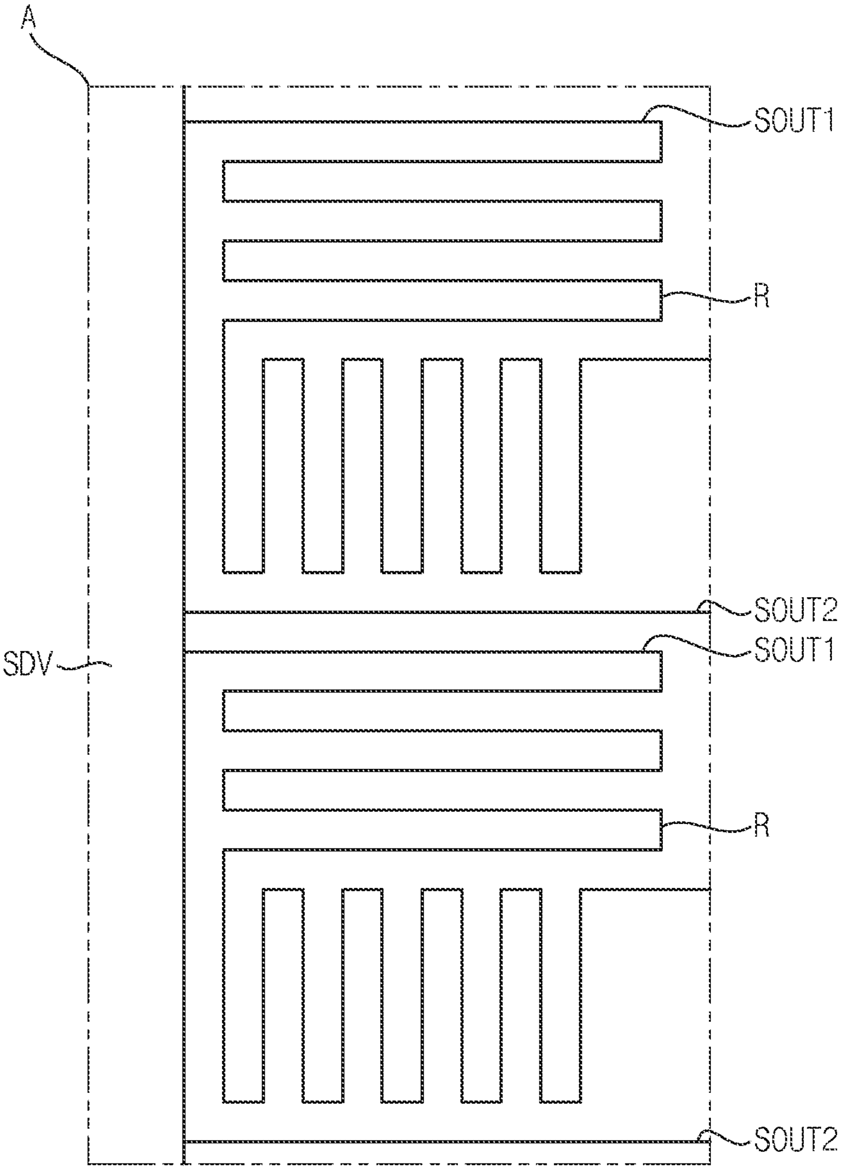
FIG. 6 is an enlarged plan view of area A of FIG. 1.

FIG. 6 is an enlarged plan view of area A of FIG. 1.

Referring to FIGS. 3, 5 and 6, the scan driver SDV may be connected to the first scan output terminal SOUT1 and the second scan output terminal SOUT2. In an embodiment, each of the first scan output terminal SOUT1 and the second scan output terminal SOUT2 may be plural, and may be alternately disposed.

The first scan output terminal SOUT1 may be connected to the first scan line (e.g., the first scan line SC1 of FIG. 3), and the second scan output terminal SOUT2 may be connected to the second scan line (e.g., the second scan line SC2 of FIG. 5).

In an embodiment, a resistance line R may be connected to the first scan output terminal SOUT1. That is, the first scan output terminal SOUT1 to which the resistance line R is connected and the second scan output terminal SOUT2 to which the resistance line R is not connected may be alternately disposed.

The resistance line R may be a metal line having resistance, and may have a shape bent a number of times. That is, the resistance line R may have a non-overlapping zigzag shape.

Figure 7:
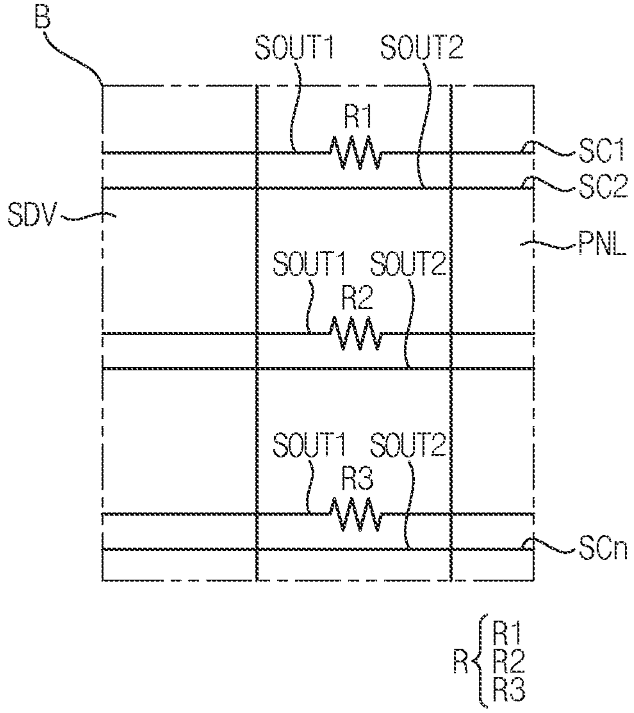
FIG. 7 is an enlarged plan view of area B of FIG. 1.

FIG. 7 is an enlarged plan view of area B of FIG. 1.

Referring to FIG. 7, each of the first scan output terminals SOUT1 may be connected to a scan line disposed in an odd row, and each of the second scan output terminals SOUT2 may be connected to a scan line disposed in an even row. Each of the first scan output terminals SOUT1 may be connected to the resistance line R.

In an embodiment, each of the first scan output terminals SOUT1 may be connected to resistance lines R having different resistance values. In an embodiment, among the first scan output terminals SOUT1, a first scan output terminal which is electrically connected to an upper side of the display panel PNL may be connected to a first resistance line R1, a second output terminal which is electrically connected to a central side of the display panel PNL may be connected to a second resistance line R2, and a third output terminal which is electrically connected to a lower side of the display panel PNL may be connected to a third resistance line R3, for example.

In an embodiment, the first resistance line R1 may have a resistance value smaller than that of the second resistance line R2, and the second resistance line R2 may have a resistance value smaller than that of the third resistance line R3. In an embodiment, the resistance value of the first resistance line R1 may be about 100 ohms (Ω), the resistance value of the second resistance line R2 may be about 200Ω, and the resistance value of the third resistance line R3 may be about 300Ω, for example, but the disclosure is not limited thereto.

Figure 8:
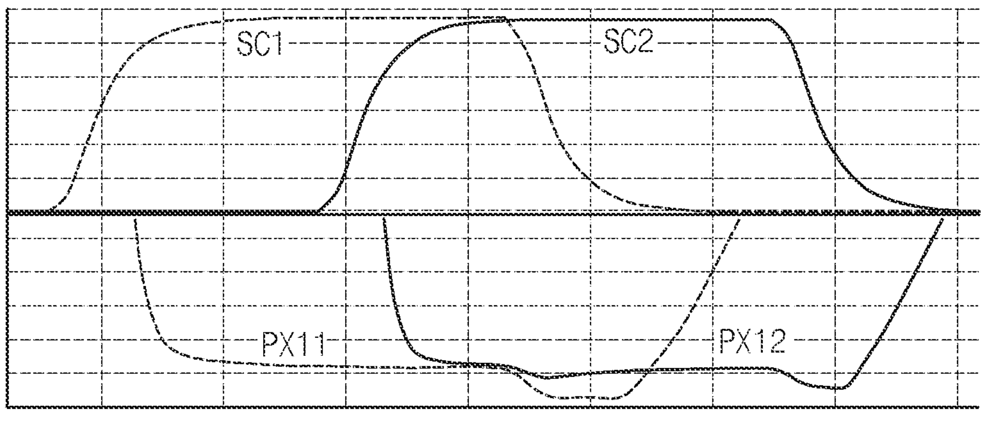
FIG. 8 is a graph for explaining a voltage deviation of pixel electrodes included in adjacent pixels.

FIG. 8 is a graph for explaining a voltage deviation of pixel electrodes included in adjacent pixels. In an embodiment, FIG. 8 may be a graph showing a deviation between a voltage of the first, second and third pixel electrodes PE1, PE2 and PE3 of the (1-1)th pixel PX11 receiving the scan signal from the first scan line SC1 and a voltage of the first, second and third pixel electrodes PE1, PE2 and PE3 of the (1-2)th pixel PX12 receiving the scan signal from the second scan line SC2, for example.

Referring FIGS. 7 and 8, when the scan signal of the first scan line SC1 falls, a coupling effect may occur between the first scan line SC1 and the first, second and third pixel electrodes PE1, PE2 and PE3 of the (1-1)th pixel PX11 overlapping the first scan line SC1 in a plan view. In addition, when the scan signal of the second scan line SC2 falls, a coupling effect may occur between the second scan line SC2 and the first, second and third pixel electrodes PE1, PE2 and PE3 of the (1-2)th pixel PX12 overlapping the second scan line SC2 in a plan view.

In this case, since the area of the portion where the first scan line SC1 overlaps the first, second and third pixel electrodes PE1, PE2 and PE3 of the (1-1)th pixel PX11 is larger than the area of the portion where the second scan line SC2 overlaps the first, second and third pixel electrodes PE1, PE2 and PE3 of the (1-2)th pixel PX12, a larger coupling effect may occur between the first scan line SC1 and the first, second and third pixel electrodes PE1, PE2 and PE3 of the (1-1)th pixel PX11.

In the display device 10 according to the disclosure, the scan driver SDV may be connected to the first scan output terminal SOUT1 and the second scan output terminal SOUT2 alternately disposed, and the first scan output terminal SOUT1 may be connected to the resistance line R. The resistor line R connected to the first scan output terminal SOUT1 may increase a falling time of the scan signal of the first scan line SC1 connected to the first scan output terminal SOUT1 to alleviate a coupling effect between the first scan line SC1 and the first, second and third pixel electrodes PE1, PE2 and PE3 of the (1-1)th pixel PX11. Accordingly, a deviation between the voltage of the first, second and third pixel electrodes PE1, PE2 and PE3 of the (1-1)th pixel PX11 and the voltage of the first, second and third pixel electrodes PE1, PE2 and PE3 of the (1-2)th pixel PX12 adjacent to the (1-1)th pixel PX11 may be improved to improve a luminance deviation between the (1-1)th pixel PX11 and the (1-2)th pixel PX12.

Figure 9:
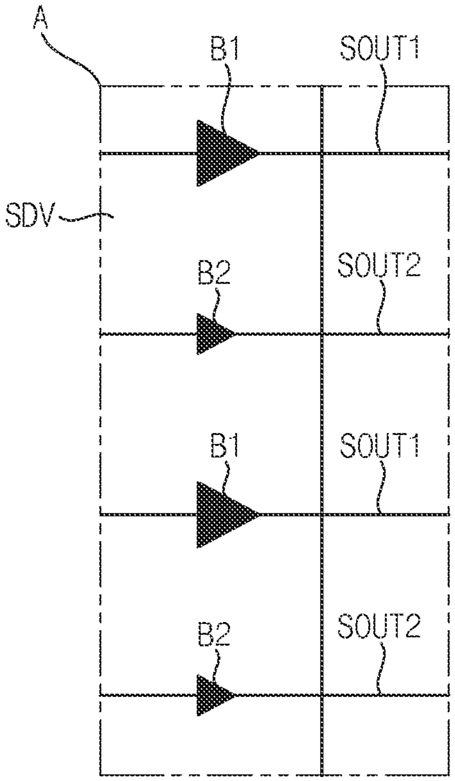
FIG. 9 is a plan view illustrating another embodiment of FIG. 6.

FIG. 9 is a plan view illustrating another embodiment of FIG. 6.

Referring to FIGS. 3, 5 and 9, the scan driver SDV may include a first output buffer B1 connected to the first scan output terminal SOUT1 and a second output buffer B2 connected to the second scan output terminal SOUT2.

Each of the first scan output terminal SOUT1 and the second scan output terminal SOUT2 may be plural, and may be alternately arranged. That is, each of the first output buffer B1 and the second output buffer B2 may be plural, and may be alternately arranged.

In an embodiment, the first output buffer B1 and the second output buffer B2 may have different sizes from each other. In an embodiment, a size of the first output buffer B1 may be larger than a size of the second output buffer B2, for example.

In the display device 10 according to the disclosure, the scan driver SDV may include the first output buffer B1 and the second output buffer B2 alternately disposed. Since the first output buffer B1 and the second output buffer B2 have different sizes, a coupling effect between the first scan line SC1 and the first, second and third pixel electrodes PE1, PE2 and PE3 of the (1-1)th pixel PX11 may be alleviated by adjusting a falling time of the scan signal of the first scan line SC1 electrically connected to the first output buffer B1. Accordingly, a deviation between the voltage of the first, second and third pixel electrodes PE1, PE2 and PE3 of the (1-1)th pixel PX11 and the voltage of the first, second and third pixel electrodes PE1, PE2 and PE3 of the (1-2)th pixel PX12 adjacent to the (1-1)th pixel PX11 may be improved to improve a luminance deviation between the (1-1)th pixel PX11 and the (1-2)th pixel PX12.

The disclosure may be applied to various display devices. In an embodiment, the disclosure is applicable to various display devices such as display devices for vehicles, ships and aircraft, portable communication devices, display devices for exhibition or information transmission, medical display devices, or the like, for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A display device comprising:

a display panel including a plurality of pixels respectively connected to a plurality of data lines and a plurality of scan lines;

a data driver which outputs data signals to the plurality of data lines including a first data line and a second data line branched from a data output terminal connected to the data driver; and a scan driver which outputs scan signals to the plurality of scan lines, wherein a first scan output terminal and a second scan output terminal respectively connected to the plurality of scan lines are connected to the scan driver, and only one of the first scan output terminal and the second scan output terminal is connected to a resistance, while the other one of the first scan output terminal and the second scan output terminal is not connected to a resistance, and the first scan output terminal and the second scan terminal are alternately disposed along one direction.

2. The display device of claim 1, wherein each of the first scan output terminal and the second scan output terminal extends in a first direction, and the first scan output terminal and the second scan output terminal are alternately disposed along a second direction perpendicular to the first direction.

3. The display device of claim 1, wherein each of the plurality of pixels includes:

a first sub-pixel which includes a first pixel electrode and emits a first light;

a second sub-pixel which includes a second pixel electrode and emits a second light different from the first light; and a third sub-pixel which includes a third pixel electrode and emits a third light different from the first and second lights, and wherein the plurality of scan lines overlaps the first, second and third pixel electrodes in a plan view.

4. The display device of claim 3, wherein the plurality of scan lines includes a first scan line connected to the first scan output terminal and a second scan line connected to the second scan output terminal, and an area of a portion where the first scan line and the first, second and third pixel electrodes of a first pixel overlap is greater than an area of a portion where the second scan line and the first, second and third pixel electrodes of a second pixel adjacent to the first pixel overlap.

5. The display device of claim 4, wherein an area of a portion where the first scan line and the first pixel electrode of the first pixel overlap is greater than an area of a portion where the second scan line and the first pixel electrode of the second pixel overlap.

6. The display device of claim 5, wherein the first light is green light.

7. The display device of claim 1, wherein the first scan output terminal is plural, and each of first scan output terminals is connected to resistances having different resistance values.

8. The display device of claim 7, wherein a first resistance connected to a first scan output terminal electrically connected to an upper side of the display panel among the first scan output terminals has a resistance value smaller than a second resistance connected to a first scan output terminal electrically connected to a lower side of the display panel among the first scan output terminals.

9. The display device of claim 8, wherein a third resistance connected to a first scan output terminal electrically connected to a central side of the display panel among the first scan output terminals has a resistance value greater than the first resistance and the resistance value smaller than the second resistance.

10. The display device of claim 1, wherein each of the first data line and the second data line is alternately connected to pixels disposed in an odd column among the plurality of pixels and pixels disposed in an even column among the plurality of pixels.

11. The display device of claim 1, wherein a first scan line among the plurality of scan lines is connected to pixels disposed in an odd column among the plurality of pixels, and a second scan line among the plurality of scan lines is connected to pixels disposed in an even column among the plurality of pixels.

12. A display device comprising:

a display panel including a plurality of pixels respectively connected to a plurality of data lines and a plurality of scan lines;

a data driver which outputs data signals to the plurality of data lines including a first data line and a second data line branched from a data output terminal connected to the data driver; and a scan driver which outputs scan signals to the plurality of scan lines, wherein a first scan output terminal and a second scan output terminal respectively connected to the plurality of scan lines are connected to the scan driver, the scan driver includes a first output buffer connected to the first scan output terminal and a second output buffer connected to the second scan output terminal and having a different size from the first output buffer, wherein each of the first scan output terminal and the second scan output terminal extends in a first direction, and the first scan output terminal and the second scan output terminal are alternately disposed along a second direction perpendicular to the first direction.

13. The display device of claim 12, wherein each of the plurality of pixels includes:

a first sub-pixel which includes a first pixel electrode and emits a first light;

a second sub-pixel which includes a second pixel electrode and emits a second light different from the first light; and a third sub-pixel which includes a third pixel electrode and emits a third light different from the first and second lights, and wherein the plurality of scan lines overlaps the first, second and third pixel electrodes in a plan view.

14. The display device of claim 13, wherein the plurality of scan lines includes a first scan line connected to the first scan output terminal and a second scan line connected to the second scan output terminal, and an area of a portion where the first scan line and the first, second and third pixel electrodes of a first pixel overlap is greater than an area of a portion where the second scan line and the first, second and third pixel electrodes of a second pixel adjacent to the first pixel overlap.

15. The display device of claim 14, wherein an area of a portion where the first scan line and the first pixel electrode of the first pixel overlap is greater than an area of a portion where the second scan line and the first pixel electrode of the second pixel overlap.

16. The display device of claim 15, wherein the first light is green light.

17. The display device of claim 12, wherein a size of the first output buffer is larger than a size of the second output buffer.

18. The display device of claim 12, wherein each of the first data line and the second data line is alternately connected to pixels disposed in an odd column among the plurality of pixels and pixels disposed in an even column among the plurality of pixels.

19. The display device of claim 12, wherein a first scan line among the plurality of scan lines is connected to pixels disposed in an odd column among the plurality of pixels, and a second scan line among the plurality of scan lines is connected to pixels disposed in an even column among the plurality of pixels.

* * * * *